US009961016B2

(12) United States Patent
Ringland et al.

(10) Patent No.: US 9,961,016 B2
(45) Date of Patent: May 1, 2018

(54) METHOD AND APPARATUS FOR A MOBILE NODE TO CONNECT DIFFERENT ACCESS ROUTERS WHILE MAINTAINING A CONSISTENT NETWORK ADDRESS

(75) Inventors: Simon Patrick Alexander Ringland, London (GB); Francis James Scahill, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 357 days.

(21) Appl. No.: 13/807,781

(22) PCT Filed: Jun. 30, 2011

(86) PCT No.: PCT/GB2011/000989
§ 371 (c)(1),
(2), (4) Date: Dec. 31, 2012

(87) PCT Pub. No.: WO2012/001362
PCT Pub. Date: Jan. 5, 2012

(65) Prior Publication Data
US 2013/0103833 A1 Apr. 25, 2013

(30) Foreign Application Priority Data
Jun. 30, 2010 (GB) .................................. 1011034.4

(51) Int. Cl.
*H04L 12/911* (2013.01)
*H04L 29/06* (2006.01)
(Continued)

(52) U.S. Cl.
CPC ........ *H04L 47/825* (2013.01); *H04L 63/0823* (2013.01); *H04L 63/0892* (2013.01);
(Continued)

(58) Field of Classification Search
CPC ....... H04W 80/04; H04W 8/26; H04W 8/082; H04W 8/08; H04W 8/087; H04W 8/12;
(Continued)

(56) References Cited

U.S. PATENT DOCUMENTS 7,593,377 B2 * 9/2009 Thubert et al. ............... 370/338
2005/0128975 A1 * 6/2005 Kobayashi .............. H04W 8/04
370/328
(Continued)

OTHER PUBLICATIONS

International Search Report for PCT/GB2011/000989, dated Oct. 14, 2011.

*Primary Examiner* — Arvin Eskandarnia
(74) *Attorney, Agent, or Firm* — Nixon & Vanderhye P.C.

(57) ABSTRACT

In a Proxy Mobile IPv6 (PMIP) network, a mobile node can roam between different access networks while maintaining a consistent IP address for session continuity. To provide access to a user's home LAN resources, even when the user's mobile node is not directly attached to the home LAN, a local mobility anchor and mobility access gateway are configured to authenticate the mobile node credentials and if authorized, to provide access to the user's LAN resources by via data tunnels and routing table reconfigurations.

10 Claims, 16 Drawing Sheets

(51) Int. Cl.
*H04W 8/08* (2009.01)
*H04W 80/04* (2009.01)
*H04W 36/00* (2009.01)
*H04W 76/02* (2009.01)

(52) U.S. Cl.
CPC ........... *H04W 8/087* (2013.01); *H04W 80/04* (2013.01); *H04L 63/162* (2013.01); *H04W 36/0011* (2013.01); *H04W 76/022* (2013.01)

(58) Field of Classification Search
CPC ..... H04W 8/14; H04W 84/12; H04W 88/182; H04W 88/08; H04W 12/02; H04W 60/00; H04W 36/0011; H04W 76/22; H04L 61/2007; H04L 61/2507; H04L 29/12216; H04L 29/12207; H04L 63/0281; H04L 63/08; H04L 47/825; H04L 63/0823; H04L 63/0892; H04L 63/162; H04L 61/25; H04L 61/07

USPC .................. 370/338, 329, 328; 455/438, 561
See application file for complete search history.

(56) References Cited

U.S. PATENT DOCUMENTS

| | | | |
|---|---|---|---|
| 2006/0018291 A1* | 1/2006 | Patel et al. ..................... | 370/335 |
| 2006/0291422 A1* | 12/2006 | Rochford ............ | H04L 63/0823 |
| | | | 370/331 |
| 2007/0107047 A1 | 5/2007 | Mukherjee et al. | |
| 2008/0095118 A1* | 4/2008 | Cakulev .............. | H04L 63/0892 |
| | | | 370/331 |
| 2009/0080441 A1* | 3/2009 | Krishnan et al. ............. | 370/400 |
| 2009/0197597 A1* | 8/2009 | Kotecha ........................ | 455/433 |
| 2010/0220738 A1 | 9/2010 | Sarikaya | |
| 2010/0226256 A1 | 9/2010 | Kato et al. | |

* cited by examiner

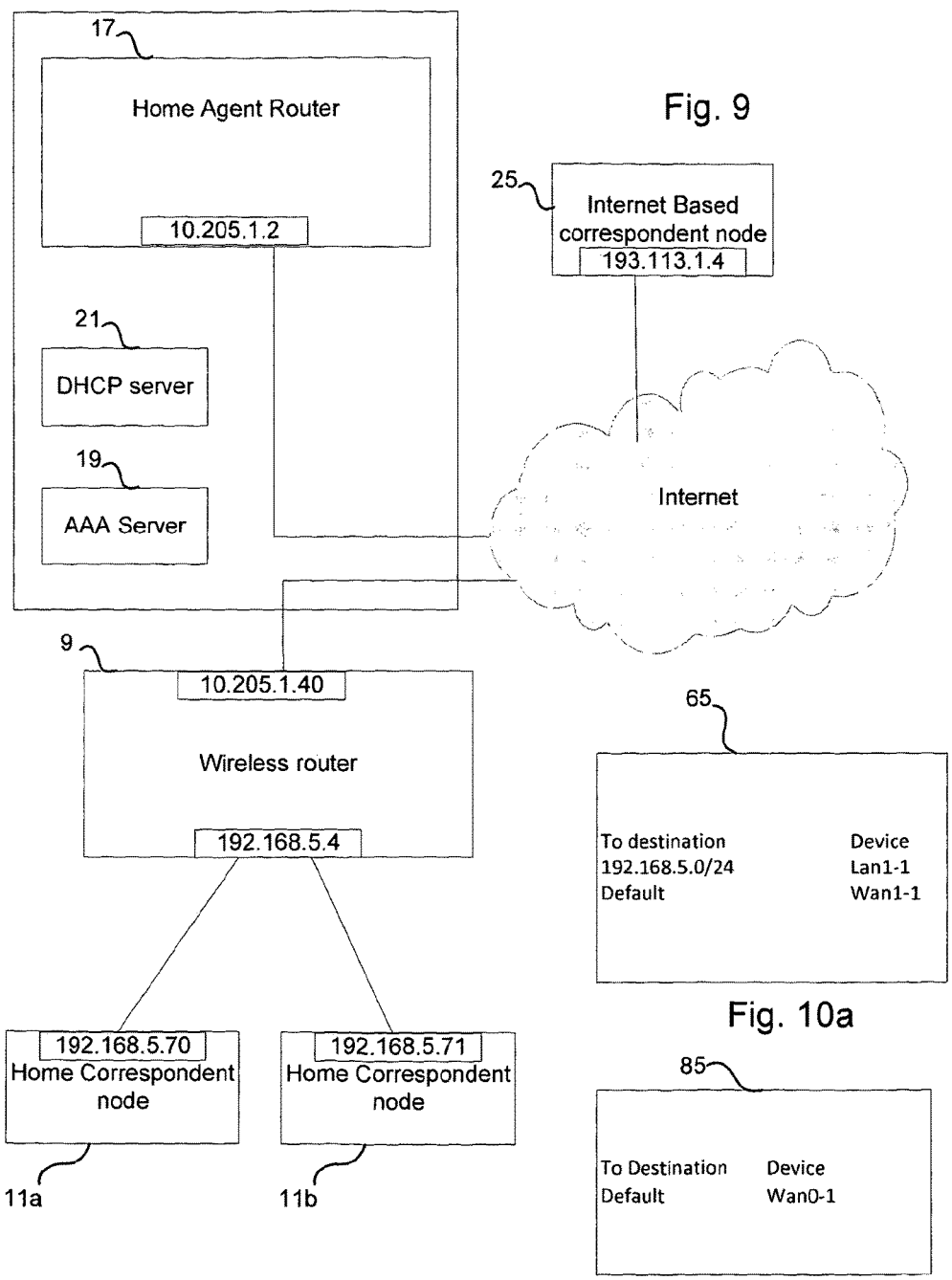

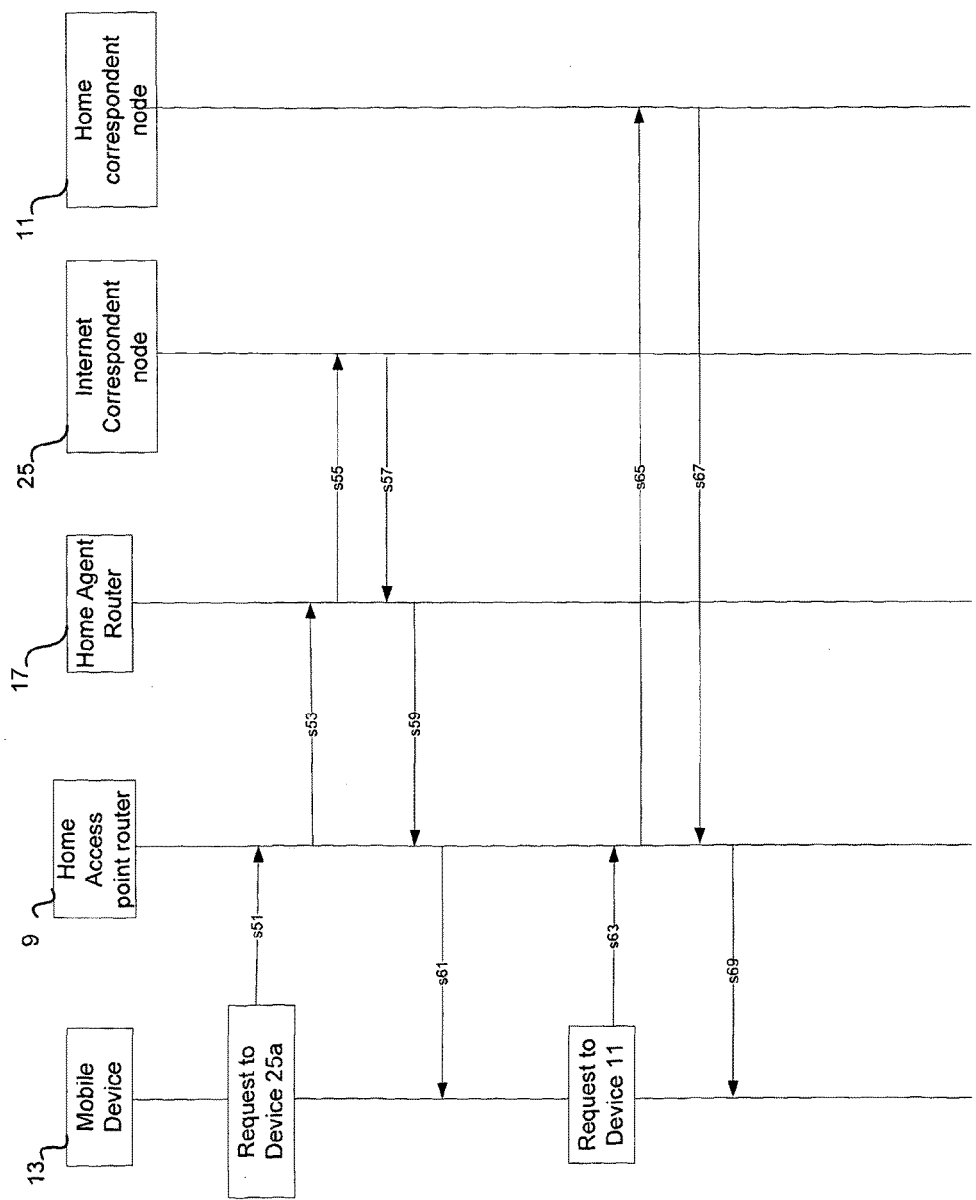

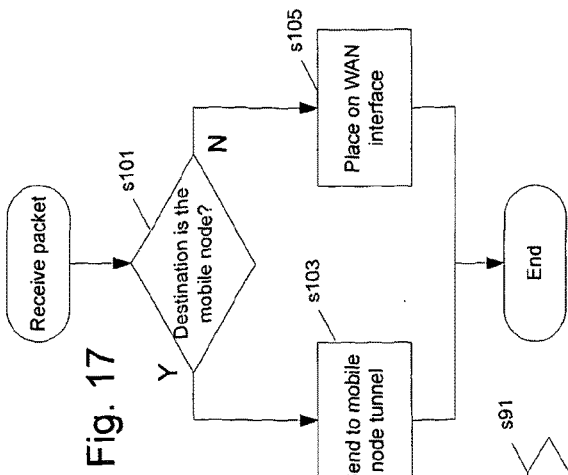
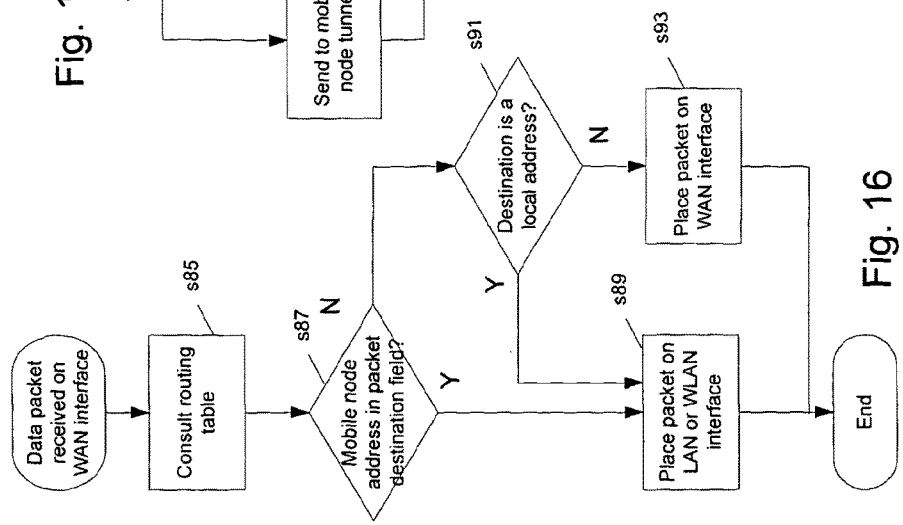
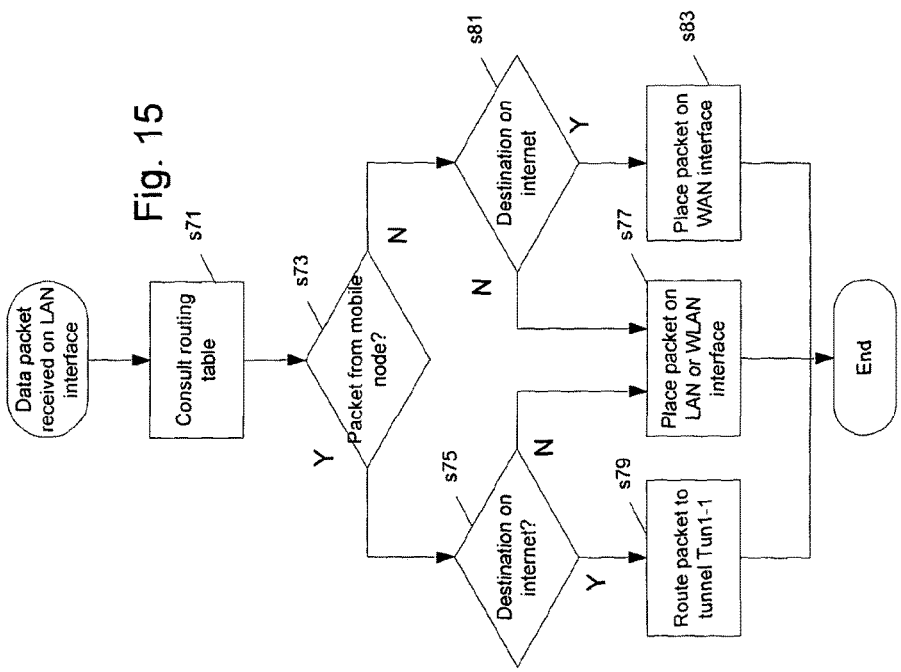

METHOD AND APPARATUS FOR A MOBILE NODE TO CONNECT DIFFERENT ACCESS ROUTERS WHILE MAINTAINING A CONSISTENT NETWORK ADDRESS

CROSS REFERENCE TO RELATED APPLICATIONS

This application is the U.S. national phase of International Application No. PCT/GB2011/000989 filed 30 Jun. 2011 which designated the U.S. and claims priority to GB Patent Application No. 1011034.4 filed 30 Jun. 2010, the entire contents of each of which are hereby incorporated by reference.

BACKGROUND AND SUMMARY

The present invention relates to computer networks and in particular to a method of configuring a network to allow access to network devices.

In recent times, mobile telephones have become more sophisticated and now often contain a wireless networking controller in addition to the usual radio transceiver capable of accessing cellular data packet networks using a protocol such as the General Packet Radio Service (GPRS), High Speed Packet Access (HSPA) or Long Term Evolution (LTE). The wireless networking controller may operate under at least one of the IEEE 802.11 family of Wi-Fi™ standards such as 802.11a, 802.11b, 802.11g or 802.11n to generate a wireless network which will hereinafter be referred to as a wireless local area network (WLAN).

Cellular data packet networks provide network access via a mobile phone operator's data network and therefore provide broad geographical network access.

In WLAN setups, a router device typically provides a wired connection to a wide area network such as the Internet and a wireless controller for providing a wireless access point. This enables network access for local mobile devices in the nearby vicinity. Within the wireless network provided by the wireless router, the wireless router functions as a gateway for the connected devices to communicate with other devices located remotely on the Internet. In this way the devices "share" an Internet connection. It is also possible for these devices to communicate with each other on the local network, for example to directly access shared resources on individual device, to access a Network Access Storage (NAS) device or a networked printer. The wireless router provides security by using a firewall to prevent access to the internal network.

With dual access to a data network, the user can choose which connection to use in dependence on their current situation and location. For example, while travelling, a 3G connection allows the user to maintain a connection over a wide geographical area. In contrast, at home, a WLAN connection would provide a faster connection but within a limited range.

Currently the user must explicitly choose which connection they wish to use, or alternatively they can set a default connection in which case they must explicitly set a different connection when desired. When the connection type changes, then any existing sessions will be lost which may interrupt any services currently running on the mobile device. For example, if the user is listening to a music streaming application, if they are in the vicinity of a WLAN spot and wish to use a WLAN connection, then the music stream will be interrupted since the mobile device's IP address will have changed.

Mobile IPv6 and Proxy Mobile IPv6 (PMIP) are networking protocols developed to address the issue of mobile node mobility. In both schemes, the mobile device is assigned an IP address which is maintained by the mobile node as it moves from one connection to another. This ability is provided by a Local Mobility Anchor (LMA) and a plurality of Mobile Access Gateways (MAGs). For each mobile device, the LMA provides a "home" address which is seen by external correspondent devices located on the Internet. All communication between the mobile device and the correspondent devices is channelled via the LMA and a tunnel is created between the LMA and the MAG closest to the mobile device. When the mobile device moves to a different location, the LMA is informed of the change and if necessary a handover procedure is carried out to destroy the existing tunnel with the previous MAG and to create a new tunnel to the new serving MAG.

In this way, session continuity is enabled by providing a session anchor point at the LMA which gives an external impression that the mobile node has a single, unchanging home IP address regardless of which access network is being used at any given time.

However, the requirement for directing all traffic through a tunnel between the LMA and the MAG to enable a consistent home IP address can be restrictive. Particularly in a case where the mobile device is attached to a WLAN wireless router in a local wireless network, the mobile device is not able to connect directly to other devices in the local area network.

For example, if a user of a mobile device such as a smart phone operating under a session continuity solution such as PMIP, is listening to internet radio on the way home using a 3G connection. When the user arrives home, the smart phone detects the user's WLAN access point and therefore gives the user the option to connect to the WLAN. The user has two choices:
 1) connect using a session continuity solution such as PMIP, establish a tunnel to the LMA and maintain their internet radio session, but lose access to their home media server; or
 2) connect directly to their home LAN and have the internet radio session break as their IP address changes.

It is desirable to enable the user to maintain session continuity when they leave or enter their own home, and to enable them to communicate with the other devices on their home LAN. In particular, it is desirable that the user's mobile device can communicate directly (via only the local wireless access point) with other devices on the home LAN when they are actually at home. It also enables them to communicate with the same LAN devices via their home broadband link when they are not at home.

In one aspect the present invention provides a method of accessing resources on a data network, the data network having a mobile node, access routers and secondary routers arranged such that the mobile node can connect to different ones of the access routers while maintaining a consistent network address to other devices, the mobile node having an associated home sub-network maintained by a home access router, the method comprising: identifying the network address of the home access router corresponding to the mobile node; modifying a routing table of the home access router to allow data packets to be exchanged between the mobile node and resources located on the home sub-network.

In another aspect, the present invention a data network comprising: a mobile node; a plurality of access routers and secondary routers arranged such that the mobile node can connect to different ones of the access routers while maintaining a consistent network address to other devices, the mobile node having an associated home sub-network maintained by a home access router; means for identifying a network address of a home access router associated with a home sub-network of the mobile node; and means for modifying a routing table of the home access router to allow data packets to be exchanged between the mobile node and resources located on the home sub-network.

BRIEF DESCRIPTION OF THE DRAWINGS

The invention will now be described by way of example with reference to the following embodiments and to the following illustrative figures in which:

FIG. 9 schematically shows an overview of the access network before the mobile node is connected;

FIG. 10a shows the example contents of a routing table of the home access point router;

FIG. 10b shows the example contents of a routing table of the home agent router;

FIG. 14 is a network message flow diagram showing how messages are passed around the access network once the mobile node is connected;

FIG. 15 is a flowchart showing the processing on packets arriving at the LAN interface of the home access point router after the mobile device has connected;

FIG. 16 is a flowchart showing the processing on packets arriving at the WAN interface of the home access point router after the mobile device has connected;

FIG. 17 is a flowchart showing the processing on packets arriving at the WAN interface of the home agent router after the mobile device has connected;

DETAILED DESCRIPTION OF PRESENT EXAMPLE EMBODIMENTS

Figure 1:
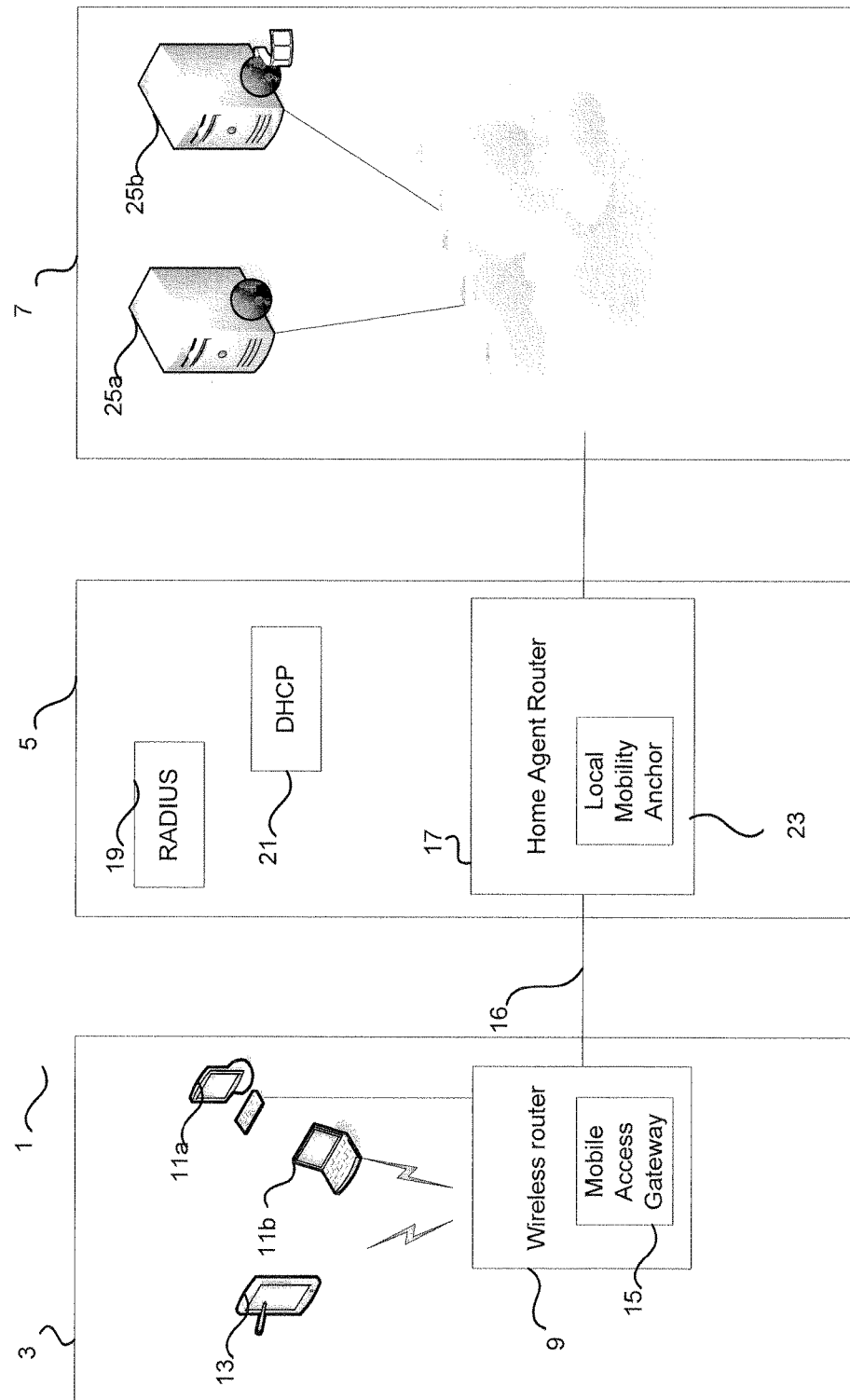
FIG. 1 shows an overview of an access network operating according to a first embodiment of the invention and including a mobile node, a home access point router and a home agent router.

FIG. 1 shows an exemplary access network 1 according to the invention. The access network can be divided into three main sections: a home network 3; an Internet Service Provider's (ISP) network 5; and the Internet 7. Each section will now be explained in turn.

The home network 3 is located at a user's premises and provides connectivity between a number of local devices and entities on the Internet. The main component defining the home network 3 is a home access point router 9. The home access point router 9 provides both wired and wireless connectivity to a number of local networked devices 11 such as computer 11a and laptop computer 11b, for example by WLAN and Ethernet. Furthermore, a mobile node device 13 such as a mobile phone, smart phone or tablet computer can also connect to the home access point router 9 and in this case is configured to connect to the network 3 using PMIP.

In order to communicate with network entities external to the local area network, the home access point router 9 is connected to the ISP network 5 using a DSL connection 16. As is conventional, the home access point router 9 therefore functions as a gateway for the local devices 11 to access content available outside of the home network such as web pages and streaming media.

In order to support the Proxy Mobile IPv6 (PMIP) protocol the home access point router 9 contains a mobile access gateway (MAG) 15. The MAG 15 is responsible for assigning mobile nodes 13 with a PMIP home address rather than a local IP address and for routing packets to the local devices. The operation of the MAG 15 will be described in more detail later.

The next section in the access network 1 is the ISP network 5. This section contains the Internet Service Providers core network infrastructure and provides centrally managed services to the home access point router 9 and any other home access point routers belonging to other users (not shown). For describing the invention, the main components are a home agent router 17, an authentication, authorization and accounting (AAA) server 19 for providing authentication, authorization and accounting services using the Remote Access Dial In User Service (RADIUS) protocol, and a Dynamic Host Configuration Protocol (DHCP) server 21 for providing IP addresses.

The home agent router 17 is provided for enabling PMIP functionality within the ISP network 5. In particular it contains a Local Mobility Anchor (LMA) 23 for providing mobile nodes 13 with IP addresses and for forming routing tunnels as will be described in more detail later.

Finally the Internet section 7 of the access network 1 contains a number of external Internet devices 25 which can communicate with the local devices 11 and the mobile node 13. In this embodiment the Internet devices 25, hereinafter referred to as "Internet correspondent nodes" 25 include a media server 25a and a web page server 25b.

The main functional components of the access network 1 will now be described.

Figure 2:
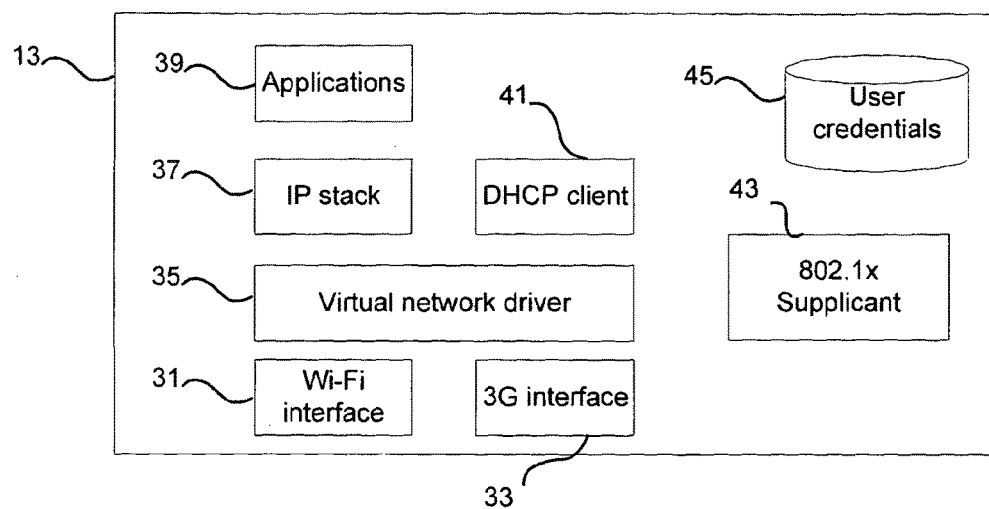
FIG. 2 schematically shows the functional components of the mobile node illustrated in FIG. 1.

FIG. 2 schematically shows the functional components of a mobile node 13 illustrated in FIG. 1. The mobile node 13 is a wireless device and contains both a WLAN interface 31 and a 3G interface 33 for communicating with other devices such as home access point router 9. In this embodiment, a make-before-break handover is required and therefore the mobile node 13 also contains a virtual network driver 35 for providing an abstracted network interface so that higher network layers will only see a single IP address across the different physical network interfaces. At the higher network layers, an IP stack 37 is responsible for passing lower network layer packets to high level applications 39. A DHCP client 41 is responsible for obtaining an IP address.

Other components include a user credentials store 43 and an 802.1x supplicant 45 for presenting the credentials to the AAA server 19.

Figure 3:
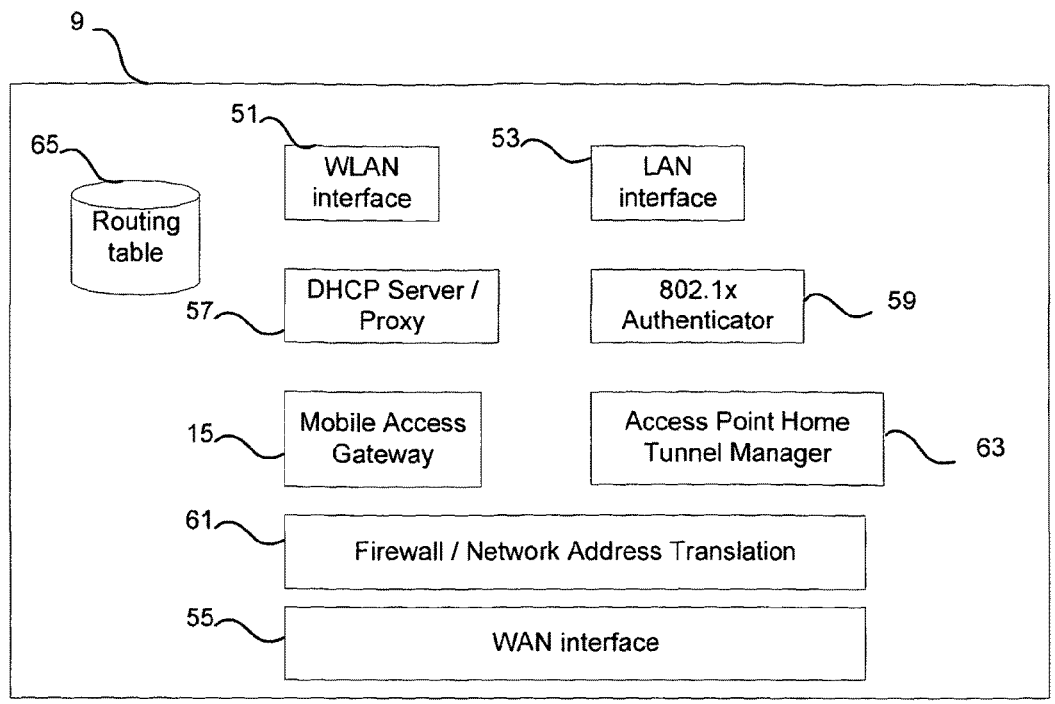
FIG. 3 schematically shows the functional components of the home access point router illustrated in FIG. 1.

FIG. 3 schematically shows the functional components of a home access point router 9 in the first embodiment. To communicate with a range of other network entities, the home access point router 9 contains a Wireless Local Area Network (WLAN) interface 51, a Local Area Network (LAN) interface 53 and a Wide Area Network (WAN) interface 55. In this embodiment, the WLAN interface 51 operates in accordance with the 802.11g wireless protocol, the LAN interface 53 operates in accordance with the Ethernet protocol and the WAN interface 55 operates in accordance with the Digital Subscriber Line (DSL) protocol.

The home access point router 9 operates the WLAN interface 51 and the LAN interface 53 to communicate with the local devices 11 and the WAN interface 55 is enabled for communication with the Internet 7 via the ISP access network 5. The home access point router 9 also contains a DHCP server or proxy unit 57, an 802.1x authenticator 59, a firewall or network address translation (NAT) module 61, a Mobility Access Gateway 15, an Access Point Home Tunnel manager 63 and a routing table 65 for use by the network interfaces 51, 53, 55 in directing the flow of packets between the local and external facing interfaces of the home access point router 9 towards their intended destinations.

As is conventional, the firewall 61 is responsible for monitoring the contents of packets transferred across the WAN interface 55 and rejecting those which should not be allowed onto the WLAN/LAN. The NAT module 61 is further responsible for changing the source address of packets received from the WLAN/LAN interface 51, 53 towards the WAN interface 55, and changing the destination address of packets received from the WAN interface 55 towards the WLAN/LAN interface 51,53 so that the local addresses of devices 11 on the LAN side are not exposed to the other sections 5, 7 of the network 3.

The DHCP server 57 is used for allocating local IP addresses whilst the 802.1x authenticator 59 is used for authentication of any devices connected on the WLAN interface 55.

The Mobile Access Gateway 15 implements part of the PMIP system. It adjusts the routing table entries in the routing table 65 of the home agent router 9 which govern how data traffic is handled by the home access point router 9.

The Access Point Home tunnel manager 63 is responsible for creating data tunnels to a network home tunnel manager located in the home agent router 17 and managing them, for example by combining the traffic from two different mobile nodes into a single tunnel instead of creating two separate tunnels to the same destination. The functionality of the access point home tunnel manager 63 also includes destroying tunnels when they are no longer needed. The operation of the access point home tunnel manager 63 will be described in more detail later.

Figure 4:
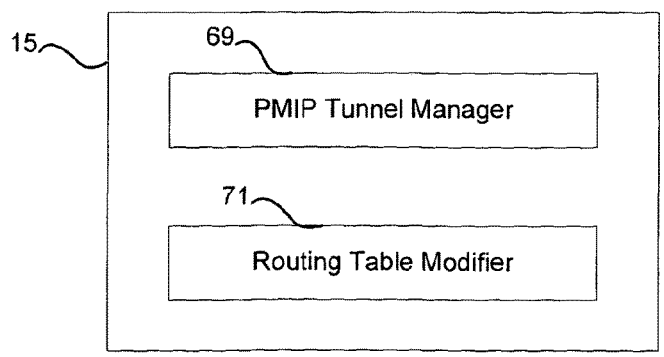
FIG. 4 schematically shows the functional components of the Mobile Access Gateway illustrated in FIG. 3.

FIG. 4 shows the functional components of the mobile access gateway 15 of FIG. 1 and FIG. 3. The Mobile Access Gateway 15 contains a routing table modifier 71 and a PMIP tunnel manager 69. The PMIP tunnel manager 69 is responsible for creating data tunnels to the local mobility anchor 23 of the home agent router 17 and managing them, for example by combining the traffic from two different mobile nodes into a single tunnel instead of creating two separate tunnels to the same destination. The functionality of the PMIP tunnel manager 69 also includes destroying tunnels when they are no longer needed.

The routing table modifier 71 is responsible for changing the routing table 65 of the home access point router 9 in response to the presence or absence of a mobile node 13 on the WLAN interface. It configures the routing table 65 to provide communication between devices 11 on the local side of the LAN/WLAN and the mobile node 13, and between the mobile node 13 and internet based correspondent nodes 25a and 25b.

Figure 5:
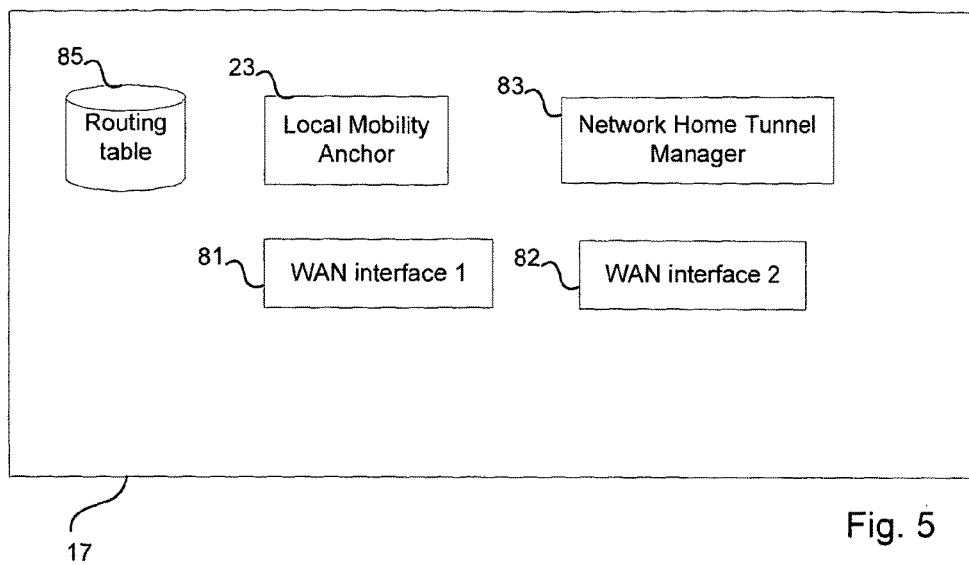
FIG. 5 schematically shows the functional components of the home agent router illustrated in FIG. 1.

FIG. 5 shows a schematic view of the functional components of a home agent router 17 located in the ISP network 5 as shown in FIG. 1. The home agent router 17 contains a WAN interface 81, in this case operating to the DSL protocol for communicating with devices on the local network 3 such as the home access point router 9 and other devices located on the Internet 7 such as the internet correspondent nodes 25.

The home agent router 17 also includes a local mobility anchor 23, for managing the various mobile devices connected on the access network 1, and a network home tunnel manager 83 for communicating with the access point home tunnel manager 63 of the home access point router 9. A routing table 85 stores the routing information necessary to redirect received data packets to the intended recipients (mobile nodes 13 and correspondent nodes 11, 25).

Figure 6:
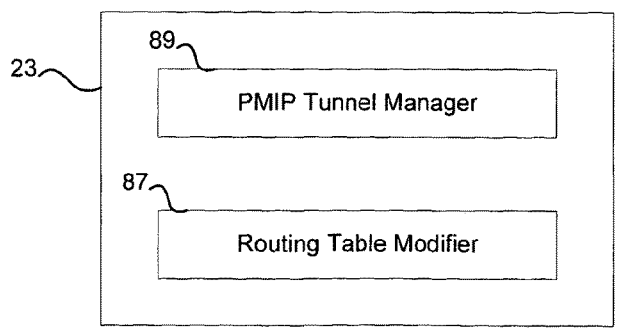
FIG. 6 schematically shows the functional components of the Local Mobility Anchor illustrated in FIG. 5.

FIG. 6 shows the functional components of the local mobility anchor 23. The LMA 23 contains a routing table modifier 87 for changing the entries of the home agent router's 17 routing table 85. The PMIP tunnel manager 89 communicates with the PMIP tunnel manager 69 of the home access point router 9.

Now that the functional components of the access network have been described, an example of the operation of the access network 1 will be described.

Prior to the operation of the access network in routing packets according to the first embodiment, a registration procedure must be performed in order to create an association between the mobile node 13 and a particular home access point router 9. The steps of the registration will be described below with reference to FIGS. 7 and 8.

In this embodiment, it is assumed that the home access point router 9 is provided with a certificate or private-public key pair which allows it to be uniquely and securely identified at manufacture.

The home access point router 9 is also provided with the certificate (public key) of an authentication, authorisation and accounting (AAA) server (19) which it can use to validate the user certificates from any mobile nodes 13.

Figure 7:
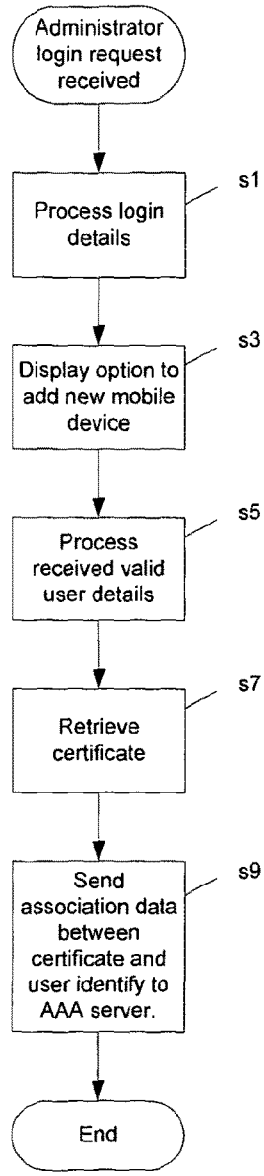
FIG. 7 is a flowchart showing part of a registration process to register a user.

FIG. 7 is a flowchart showing the operation of the home access point router 9 when an authorised user of the LAN/WLAN provided by the home access point router 9 wishes to register a new authorised mobile node 13. To initiate the registration process, the administrator of the home access point router 9 connects to an administration web page hosted by the home access point router 9. In this embodiment, this can only be carried out from a local machine which is connected to the local LAN using a wired connection. The user must have the admin password for the home access point router 9. In step s1, the home access point router 9 processes the authorised user's login details.

Once logged onto the administration page, in step s3, the home access point router 9 displays an option on the administration web page to add a user of a new mobile node 13.

The administrator defines a list of valid users that are permitted local LAN access from their mobile terminal and these details are received and processed by the home access point router 9 at step s5. In this embodiment there is only a single user and the valid users are uniquely identified, for example by email address.

After the user information has been entered, the association between home access point router 9 and the user's mobile node 13 are stored. In step s7 the home access point router 9 retrieves the pre-stored certificate which uniquely identifies it and in step s9, sends the list of allowed users signed by the home access point router's 9 certificate to the AAA server 19.

Figure 8:
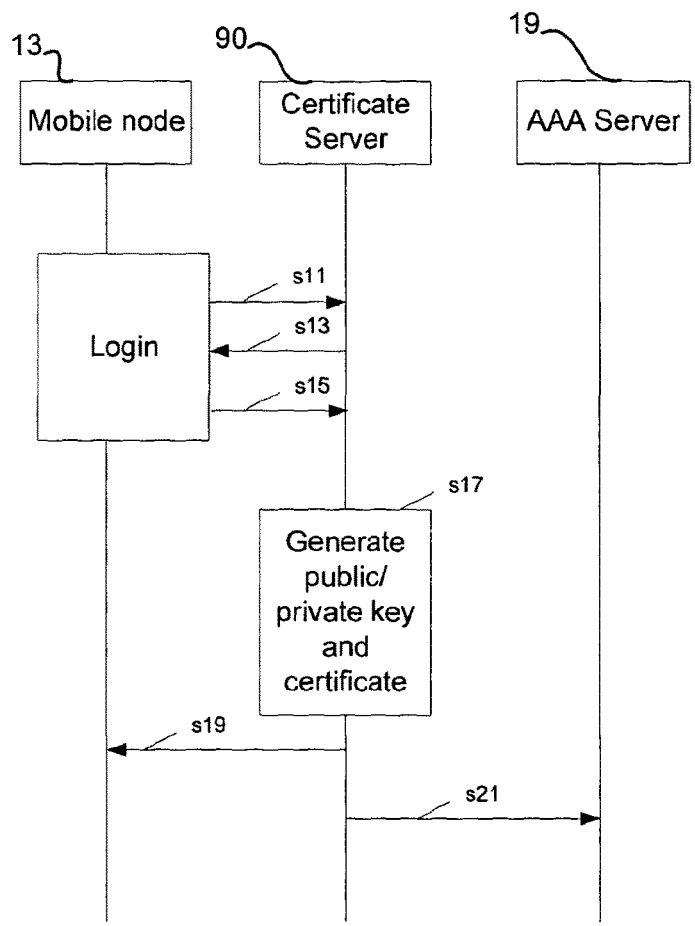
FIG. 8 is a flowchart showing the registration of a mobile node.

As shown in FIG. 8, to register the user's mobile node, the user first connects in step s11 to a web site hosted by an appropriate certificate provisioning server 90. In step s13, the certificate provisioning server 90 prompts the user to enter their unique identifier and associated security credentials and in step s15 the mobile node responds with those credentials, e.g. a username and password.

Once these details have been entered, at step s17 the certificate provisioning server generates a private-public key pair together with an Extensible Authentication Protocol Transport Layer Security (EAP-TLS) certificate linking the public key to the user identifier. In step s19, these credentials are delivered to the mobile node 13 and stored in the user credentials store 45. In this embodiment the certificate is delivered using the Simple Certificate Enrolment Protocol (SCEP). Of course, a variety of protocols could be used such as Open Mobile Alliance Client Provisioning or Device Management (OMA CP/DM) or WAP Push, and different credentials such as those stored on the mobile SIM card could be used instead.

Finally, in step s21, the mapping between the user identity and the certificate/other credentials is stored in the AAA server 19.

To aid explanation, FIG. 9 shows an initial state of the access network 1 in which the mobile node 13 is registered as described above but not yet present at the local area network.

In this initial state, the home access point router 9 is arranged to provide a local area network by WLAN or LAN to local devices 11a and 11b and also a connection to content available from servers 25 on the Internet 7.

A summary of the various IP addresses assigned to each device interface is summarised below:
Home access point router 9
WLAN IP address: 192.168.5.4—Device name Lan1-1.
WAN IP address: 10.205.1.40—Device name Wan1-1.
Home agent router
IP address: 10.205.1.2—Device name Wan 0-1.
DHCP (DHCP) Server
IP address: 10.205.1.1—Device name Wan 3-1.
AAA Server
IP address: 10.205.1.3
Home network correspondent node 11a
IP address: 192.168.5.70
Home network correspondent node 11b
IP address: 192.168.5.71
Internet correspondent node
IP address: 193.113.1.4

As shown in FIG. 10a, in this initial state, the routing table 65 of the home access point router 9 contains the following routing information:

| To destination | Device |
|---|---|
| 192.168.5.0/24 | Lan1-1 |
| Default | Wan1-1 |
| Rule | |
| From Source | To destination | Device |

In this case, the configuration of the home access point router 9 causes any received data packets to be examined and if the destination of the examined packets is a local network address then the packets are forwarded to the LAN interfaces 51, 53, otherwise packets are forwarded to the WAN interface 55 for onward transmission.

The home agent router 17 is not being utilised at this point and therefore as shown in FIG. 10b the routing table 85 of the Home Agent Router 17 contains:

| To Destination | Device |
|---|---|
| Default | Wan0-1 |

Figure 11:
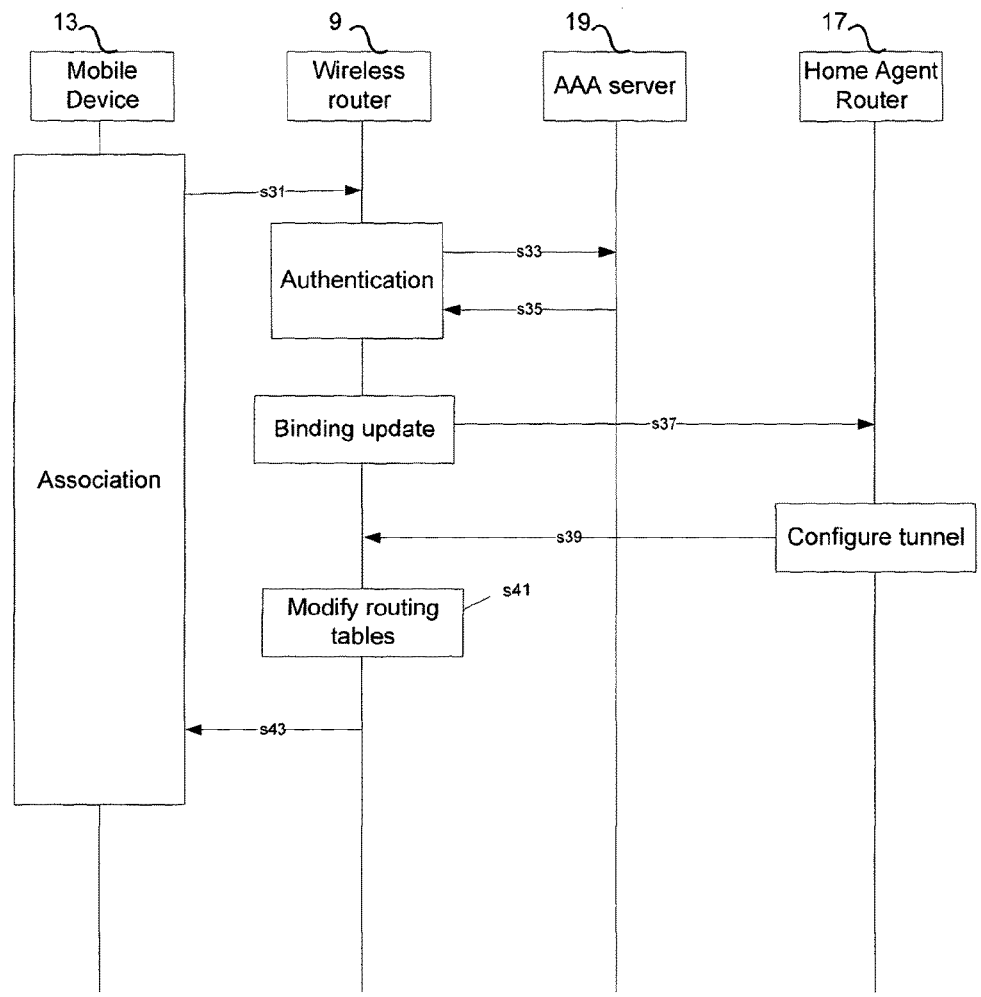
FIG. 11 is a message flow diagram of between network components when the mobile node connects to the network.

When the mobile node 13 is activated in the range of the home access point router 9, the WLAN interface 31 detects the presence of the Home access point router's 9 WLAN and attempts to connect in order to obtain an IP address, FIG. 11 shows the message flow between the various entities in the local access network 3 and the ISP network 5.

In step s31 the mobile node 13 attempts to associate with the home access point router 9 using 802.1x authentication. The 802.1x supplicant 43 uses the previously stored EAP-TLS certificate stored in the user credentials store 45 as its identity claim to the home access point router 9. In step s33, the authentication request is processed by the 802.1x authenticator 59 of the home access point router 9 which forwards the authentication request to the AAA server 19. In this embodiment, the mapping between the user identity and their home access point router 9 established in the registration phase is stored in the AAA Server 19. In step s35, the 802.1x authentication response from the AAA server 19 to the 802.1x authenticator 59 of the home access point router 9 contains a custom field indicating whether or not the user is permitted to access the local LAN. It further provides the address for that user's LMA 23.

Where the user and the mobile node 13 is determined to be allowed on the LAN of the home access point router 9, in step s37, the PMIP tunnel manager 69 of the MAG 15 sends a binding update for the mobile node 13 to the appropriate LMA 23 of the home agent router 17. The binding update includes the IP address of the home access point router 9 and the identity information of the mobile node 13. The binding update creates a tunnel (based on IP in IP or GRE) between the MAG 15 and the specified LMA 23 if one doesn't exist. In step s39, the PMIP tunnel manager 89 of the LMA 23 responds with an IP address to allocate to the mobile node 13, and further includes an indication that the binding update has been successful. In step s41 the routing table modifier 71 of the MAG 15 modifies the routing table 65 of the home access point router so that:

All traffic from the PMIP tunnel destined for the mobile node's 13 IP address is forwarded to the mobile node 13 (the mapping between the IP address and the MAC address of the mobile node is already held in the router's ARP tables); and All traffic from the mobile node to IP addresses on the local LAN is forwarded to the local LAN.

However, in accordance with the first embodiment, since the mobile node is allowed to access the local LAN, the routing table modifier 71 further adjusts the routing table 65 so that:

All traffic from the mobile node 13 to IP addresses not on the local LAN is forwarded down the PMIP tunnel;

All traffic from other local LAN nodes (i.e. not the mobile node 13) destined for the IP address of the MN is forwarded directly to the mobile node 13; and All other traffic from other nodes on the local LAN bound for the internet is handled as normal.

Finally, in step s43, the home access point router 9 provides the allocated IP address to the mobile node 13.

Figure 12:
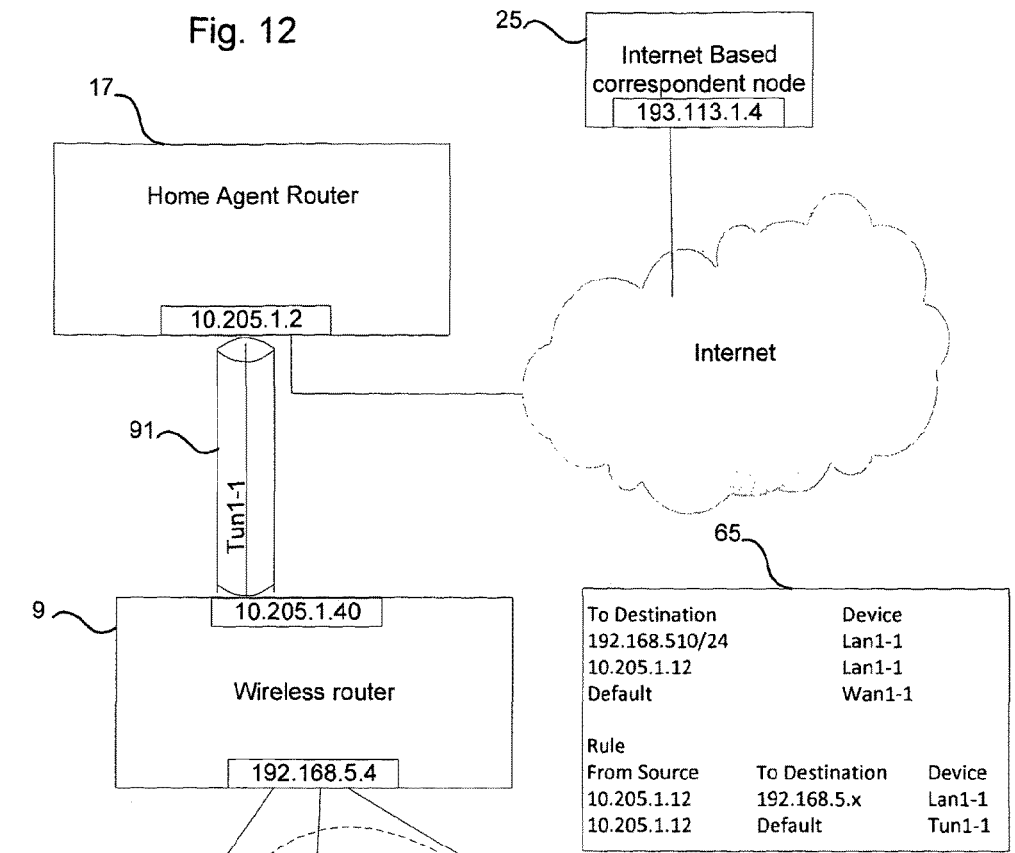
FIG. 12 schematically shows an overview of the access network after the mobile node is connected.

FIG. 12 is a schematic view of the access network 1 after the mobile node 13 has been added to the home access point router 9 LAN and allocated an IP address of 10.205.1.12, and a PMIP tunnel 91 has been created between the home access point router 9 and the home agent router 17. The configuration of the network 1 differs from standard PMIP in this case because the mobile device 13 can still communicate with home network devices 11 even though their IP addresses are not in the same range or subnet. This is due to the configuration of the routing tables.

Figure 13A:
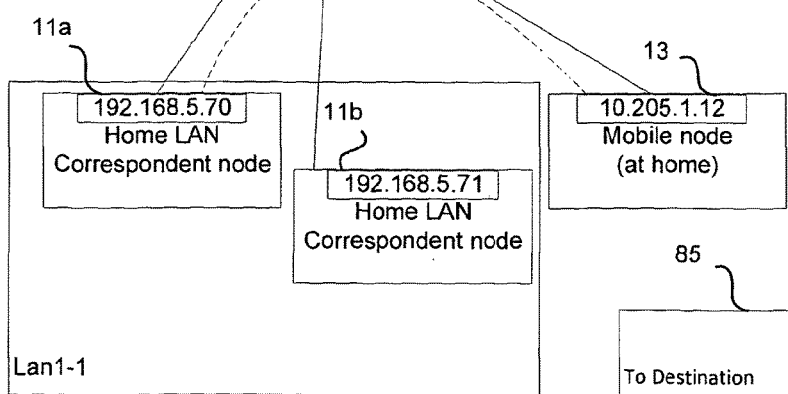
FIG. 13a shows the example contents of a routing table of the home access point router after the mobile node is connected.

As described above, the home agent router 31 is configured by the LMA 21, and the home access point router 9 is configured by the MAG 19. As shown in FIG. 13a, in this example network, the MAG 19 has updated the routing table 65 of the home access point router 9 as follows:

| To Destination | Device |
|---|---|
| 192.168.5.0/24 | Lan1-1 |
| 10.205.1.12 | Lan1-1 |
| Default | Wan1-1 |

-continued

| Rule | | |
|---|---|---|
| From Source | To Destination | Device |
| 10.205.1.12 | 192.168.5.x | Lan1-1 |
| 10.205.1.12 | Default | Tun1-1 |

Figure 13B:
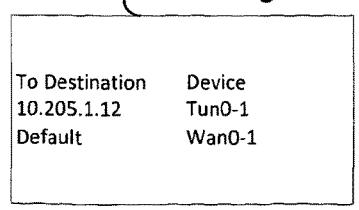
FIG. 13b shows the example contents of a routing table of the home agent router after the mobile node is connected.

As shown in FIG. 13b, to account for the new tunnel, the LMA 21 has updated the routing table 85 of the home agent router 17:

| To Destination | Device |
|---|---|
| 10.205.1.12 | Tun0-1 |
| Default | Wan0-1 |

FIG. 14 shows the information flow for communications originating from the mobile node 13. In step s51, the mobile device 13 sends data packets to the home access point router 9 addressed to the internet correspondent node 25a having an IP address of 193.113.1.4. At the home access point router 9 the routing table 65 indicates that packets from the mobile node 13 (IP address 10.205.1.12) should be sent via the tunnel Tun1-1 to the home agent router 17. At step s53 the packets are therefore sent to the home agent router 17. At the home agent router 17 no special routing provisions apply and therefore at step s55 the packet is placed on the WAN interface 81 and the network routes the packet to the internet correspondent node 25a.

In step s57 response packets are sent from the internet correspondent node 25a to the mobile device 13. The packets are addressed to the mobile node's home address of 10.205.1.12 and therefore arrive at the home agent router 17. The home agent router's 17 routing table 85 includes an entry that data packets addressed to the mobile node's 13 IP address should be tunnelled to the home access point router 9. The packets are sent in step s59.

At the home access point router 9, the routing table 65 contains an entry which states that packets to the mobile node's 13 IP address should be sent to the LAN side of the network. At step s61, the packets are sent to the mobile node 13.

In another case, when the mobile device requires communication with a device attached to the home access point router's LAN such as local device 11a, data packets are sent in step s63 addressed to the home correspondent node's IP address (192.168.5.70).

At the home access point router 9, the routing table shows that data packets with a destination field in the range of 192.168.5.0/24 are to be sent back onto the LAN and therefore in step 65, the data packets are sent to the home correspondent node 11a.

The reply from the home correspondent node 11a to the mobile node's 13 IP address of 10.205.1.12 is transmitted at step s67. When the data packets arrive at the home access point router 9 the routing table 65 indicates that instead of sending the data onto the WAN interface, they are to be transmitted on the Lan1-1 interface. Therefore in step s69, the packets are delivered to the mobile node 13.

The above processing in steps 43 to 49 is more efficient than normal PMIP since the packets do not need to be routed via the home agent router 17 before arriving at their destination on the local network. Also, devices attached to the home access point router 13 are not typically visible to internet based nodes due to the firewall and NAT 61, and so would not be accessible to a PMIP connected node.

FIGS. 13 to 15 are flowcharts showing the processing of the network interfaces of the home access point router 9 and the home agent router 17 as a result of the changes to the routing tables.

FIG. 15 is a flowchart of the operation of the LAN interface and WLAN interface of the home access point router 9. In response to a packet arriving, in step s71 the routing table 65 is consulted. The interface reads the packet header to determine at step s73 if the packet came from the mobile node 13. If so, processing proceeds to step s75 in which the destination of the packet is determined. If the packet is addressed to a LAN or WLAN address processing proceeds to step s77 where the packet is sent out via the LAN or WLAN interface as appropriate and processing ends. Otherwise the packet is sent out via the tunnel to the home agent router 17 in step s79 and processing ends.

Returning to step s73, if the source field of the data packet is not from the mobile node 13, then processing proceeds to step s81 where the destination field is checked. If the destination of the packet is an address on the local LAN or WLAN, the processing proceeds to step s77 where the packet is sent out on the LAN or WLAN interface as appropriate. Alternatively, if the packet is addressed to a remote address, then the packet is sent out on the WAN interface in step s83.

FIG. 16 is a flowchart of the operation of the WAN interface of the home access point router 9. In response to a packet arriving, at step s85 the routing table is consulted. Processing then proceeds to step s87 in which the destination field of the packet is checked to see if the packet is addressed to the mobile node 13. If it is then in step s89 the packet is sent out on the LAN interface.

If the packet is not addressed to the mobile node, then processing proceeds to step s91 in which the packet destination field is checked to see if it is addressed to a local device. If it is, then in step s89 the packet is sent via the LAN interface. Otherwise in step s93 the packet is sent on the WAN interface and processing ends.

FIG. 17 is a flowchart of the operation of the WAN interface of the home agent router 17 when a new packet arrives. In step s101 the destination field of the packet is checked and if it is addressed to the mobile node then in step s103 the packet is sent onto the tunnel to the home access point router 9 and processing ends. If the mobile node is not the destination then in step s105 the packet is sent out on the WAN interface.

As mentioned earlier, the purpose of PMIP is to allow the mobile node to move geographically across different access networks while maintaining a fixed logical presence within the network. This is achieved by the interaction between the home agent router 17 located within the ISP network section 5 (in particular the Local Mobility Anchor unit 23) and the home access point routers 9 (in particular the Mobile Access Gateway 15) that can provide network access to the mobile node 13.

Figure 18:
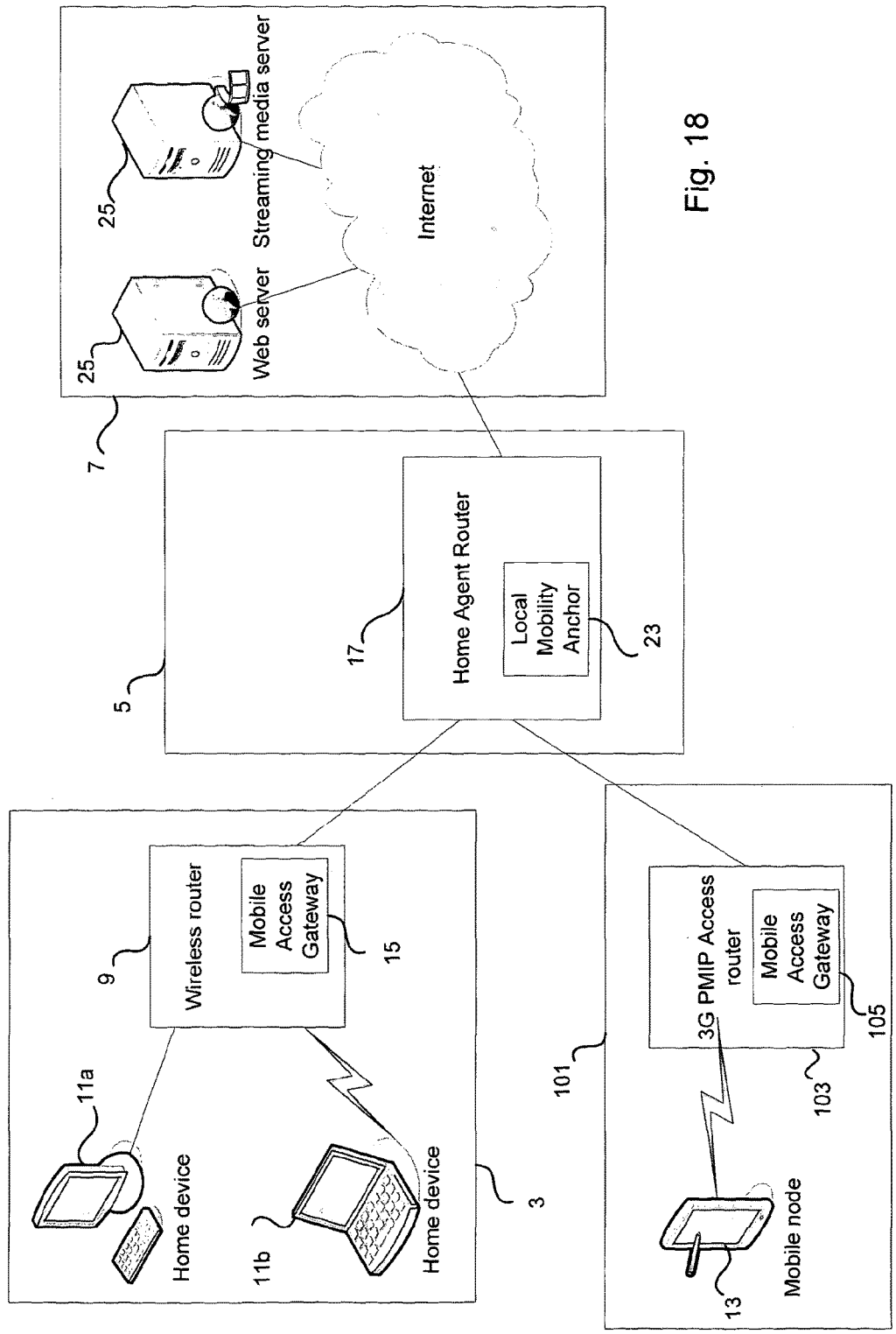
FIG. 18 schematically shows an overview of the access network when the mobile node has migrated to a 3G access network.

FIG. 18 shows the access network 1 previously described in FIG. 1 now including a further access network section 101. In this case the access network section 101 is a mobile phone data network and is managed by a 3G PMIP access point router 103. The 3G PMIP access router 103 also contains a mobile access gateway 105 for providing access to the ISP network section 5 and the local mobility anchor 23 for implementing PMIP. The specific implementation of the 3G PMIP access point router is not directly relevant to the invention and has therefore not been described. The MAG 105 is however structurally similar to the MAG 15 of the home access point router 9.

PMIP allows the mobile node to move from the home access network 3 to the 3G access network 101 without losing session continuity or network identity.

Figure 19:
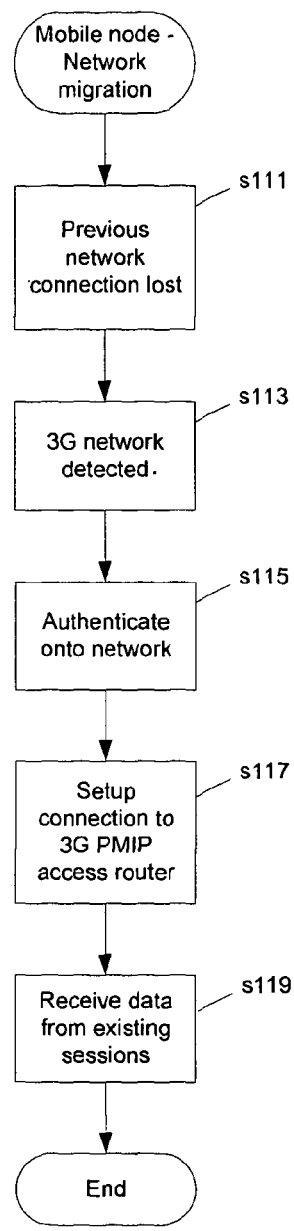
FIG. 19 is a flowchart showing the operation of the mobile node when it moves to a different location.

FIG. 19 shows the operation of the mobile node 13 when the mobile node 13 has moved to a 3G cellular network away from home. In step s111, the loss of the previous data network connection is detected. In this example, the WLAN interface 31 does not detect the previous LANs but in step s113 non-home connectivity is detected by the 3G interface 33 of the mobile node 13. The virtual driver 35 therefore initiates the opening of a connection.

In step s115, the mobile node 13 authenticates with the network using standard cellular mechanisms such as Universal Subscriber Identity Module (USIM) to connect to the data network. These techniques are well known in the art and will not be described in detail.

Having authenticated onto the 3G network, in step s117, the mobile node 13 requests a connection to the Access Point Name (APN) associated with the 3G PMIP access router 103. In accordance with PMIP, the MAG 105 within the 3G PMIP access point router 103 then performs a normal PMIP binding update with the user's LMA 23 to establish a PMIP tunnel and subsequently routes all from the mobile node 13 down the tunnel and at the MAG 105, all traffic from the tunnel destined for the mobile node's 13 IP address is routed to the mobile node 13. In step s119 the mobile node receives data associated with existing data sessions or starts new sessions.

Figure 20:
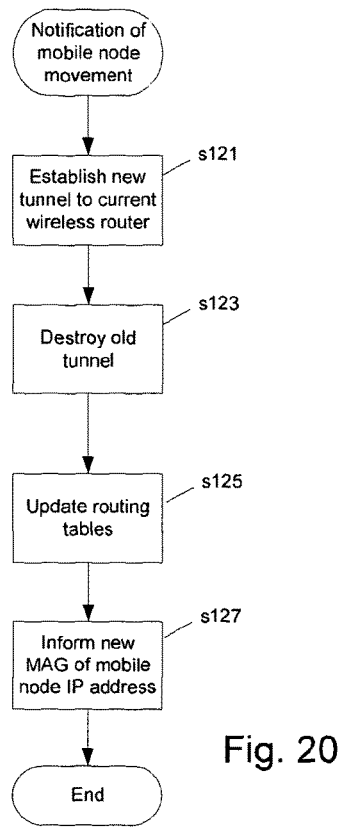
FIG. 20 is a flowchart showing the processing carried out by a PMIP tunnel manager within the home agent router once migration is detected.

As mentioned above, the MAG 105 of the 3G PMIP access point 103 notifies the mobile node's 13 LMA when network migration is detected. FIG. 20 is a flowchart showing the processing performed by the LMA 23 when it is notified of a change in the location of mobile node 13. The aim of the processing is to allow the mobile node to continue communicating under the same IP address as it had prior to the migration and to reconfigure the routing paths to ensure that packets continue to be routed to and from the mobile node correctly via the access network.

In step s121, following the notification of a mobile node migration, which includes the identity and address of the new access router, the PMIP tunnel manager 89 in the LMA 23 establishes a new IP tunnel with the new access point router 103 if one does not already exist. In this embodiment, the 3G access point 103 has an IP address of 10.205.1.41 and therefore the LMA 23 creates a tunnel it refers to as Tun0-3 having a local point of 10.205.1.2 and a remote point of 10.205.1.41. Similarly the PMIP tunnel manager 69 of MAG 105 of the 3G access point router 103 at the other end of the tunnel creates a reference to the tunnel as Tun2-1 with a local address of 10.205.1.41 and a remote end address of 10.205.1.2.

Following the establishment of this new tunnel, in step s123 the tunnel between the home agent router 17 and the home access point router 9 is no longer in use and therefore the tunnel may be destroyed if no other nodes are using it. In this case PMIP tunnel manager 89 of the LMA 23 in the home agent router 17 removes the tunnel referenced as Tun0-1, while PMIP tunnel manager 69 of the MAG 15 in the home access point router 9 removes the tunnel referenced as Tun1-1.

Having updated the tunnel configuration, in step s125 the routing tables 85 are updated by routing table modifier 87 to reflect the new location of the mobile node 13 and at step s127 the LMA notifies the 3G access point router MAG 105 of the mobile node's IP address, which in this case is maintained as 10.205.1.12 before processing ends.

Figure 21A:
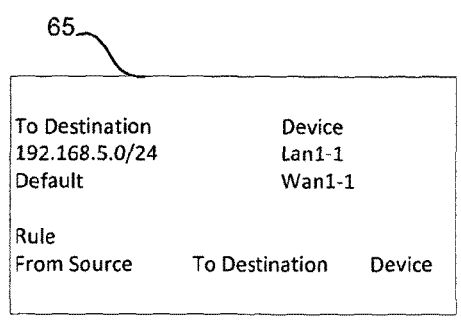
FIG. 21a shows the contents of the routing tables of the home access point router after the processing of the PMIP tunnel manager.
Figure 21B:
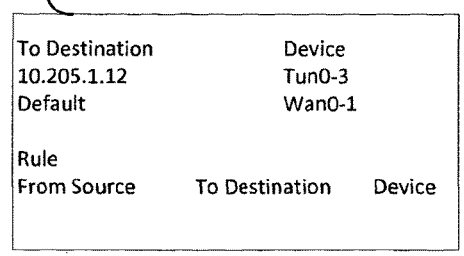
FIG. 21b shows the contents of the routing tables of the home agent router after the processing of the PMIP tunnel manager.

FIGS. 21a and 21b show the contents of the routing tables 69, 89 in home access point router 9 and the home agent router 17 respectively after the above router reconfiguration.

The flow chart in FIG. 20 describes the typical operation of the LMA using PMIP. In particular, the PMIP tunnel manager 89 creates tunnels to maintain sessions. However, with this processing alone, the mobile node 13 loses the ability to access devices and resource on the home network 3 it has just left. To address this issue, as shown in FIGS. 3 and 5, the home access point router 9 forming the home network 3 and the home agent router 17 further includes the Network Home Tunnel manager 83 and the Access point home tunnel manager 63 respectively. The operation of these units will now be described with reference to FIG. 22.

Figure 22:
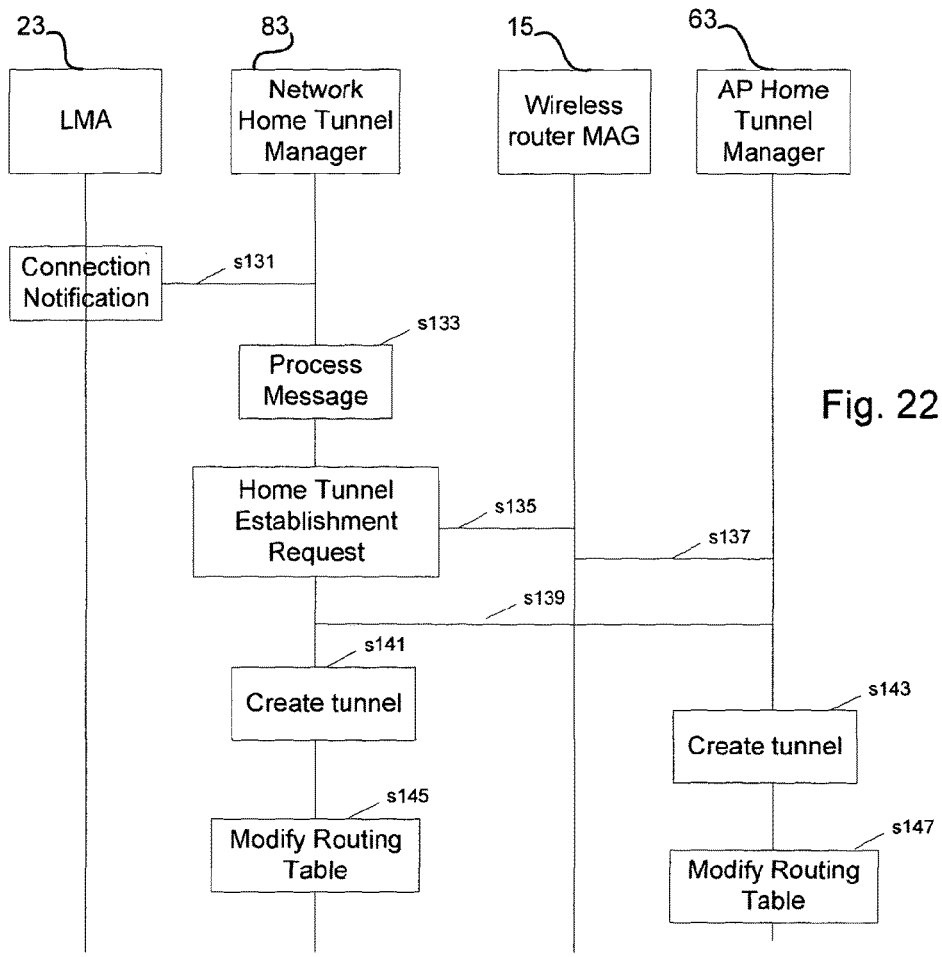
FIG. 22 is a flowchart showing the processing carried out by a Network Home tunnel manager within the home agent router and a Access Point Home tunnel manager within the home access point router once migration is detected.

FIG. 22 is a flowchart showing the operational steps to setup a "Home Tunnel" between the home agent router 17 and the home access point router 9. This tunnel and routing table reconfiguration allows a mobile node 13 operating under the PMIP scheme to roam onto different access networks while maintaining session continuity and also having access to the mobile node's 13 home network.

In step s131, the LMA 23 sends a connection notification message to its network home tunnel manager 83 containing a user identifier, the mobile node's IP address and the corresponding PMIP tunnel identifier.

Upon receipt of this connection notification message, in step s133 the network home tunnel manager 83 looks up a database mapping user identities to home router identifiers and therefore home access point router IP addresses. If an entry exists in the database for the specified user identity then the corresponding home router IP address is examined.

If this address is different from the MAG IP address in the connection notification, then in step s135 a home tunnel establishment request is sent from the network home tunnel manager 83 to the relevant home access point router 9. This message includes the IP address of the mobile node 13, its user identifier and the address of the home agent router 17. In step s137 the home access point router 9 passes the received request to its access point home tunnel manager 63.

In step s139 the access point home tunnel manager 63 within the home access point router 9 sends a response including its own private side subnet address range. In steps s141 and s143, a tunnel is then established between the home access point router 9 and the home agent router 17.

In step s145, the network home tunnel manager 83 of the home agent router 17 then modifies the routing tables 85 so that:

All traffic from the mobile node (emerging from the PMIP tunnel 111) destined for local addresses on the home network (as identified by the private side subnet address range in the response to the home tunnel establishment request is forwarded into the home tunnel 113;
All traffic emerging from the home tunnel 113 is routed down the PMIP tunnel to the mobile node 13;
All traffic from the mobile node 13 for internet addresses is routed normally to the internet.

Similarly, the access point home tunnel manager 63 of the home access point router 9 modifies the routing tables 65 in step s147 so that:

All traffic from correspondent nodes 11 to the mobile node is routed down the home tunnel 113; and
All traffic emerging from the home tunnel 113 is routed to the relevant home node 11.

Figure 23A:
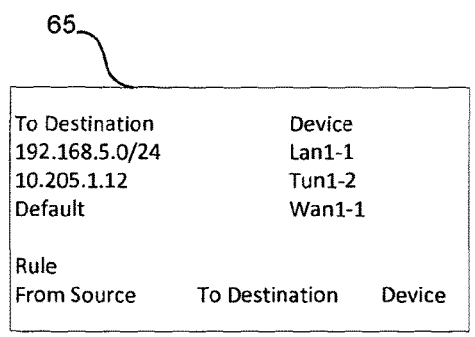
FIG. 23a shows the contents of the routing tables of the home access point router after the processing of the Access Point Home Tunnel manager.
Figure 23B:
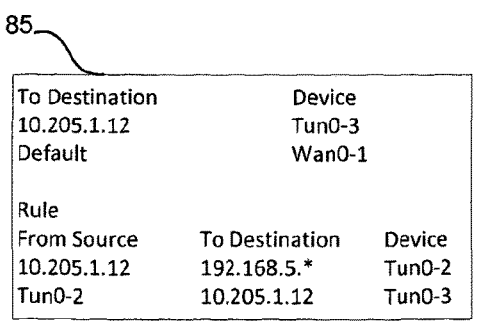
FIG. 23b shows the contents of the routing tables of the home agent router after the processing of the Network Home tunnel manager.

FIGS. 23a and 23b show the contents of the routing tables 69, 89 in home access point router 9 and the home agent router 17 respectively after the above router reconfiguration.

Wireless access point router's routing table 65:

| To Destination | Device |
| --- | --- |
| 192.168.5.0/24 | Lan1-1 |
| 10.205.1.12 | Tun1-2 |
| Default | Wan1-1 |
| Rule | |
| From Source | To Destination | Device |

The Home Agent Router's routing table 85:

| To Destination | Device | |
| --- | --- | --- |
| 10.205.1.12 | Tun0-3 | |
| Default | Wan0-1 | |
| Rule | | |
| From Source | To Destination | Device |
| 10.205.1.12 | 192.168.5.* | Tun0-2 |
| Tun0-2 | 10.205.1.12 | Tun0-3 |

Figure 24:
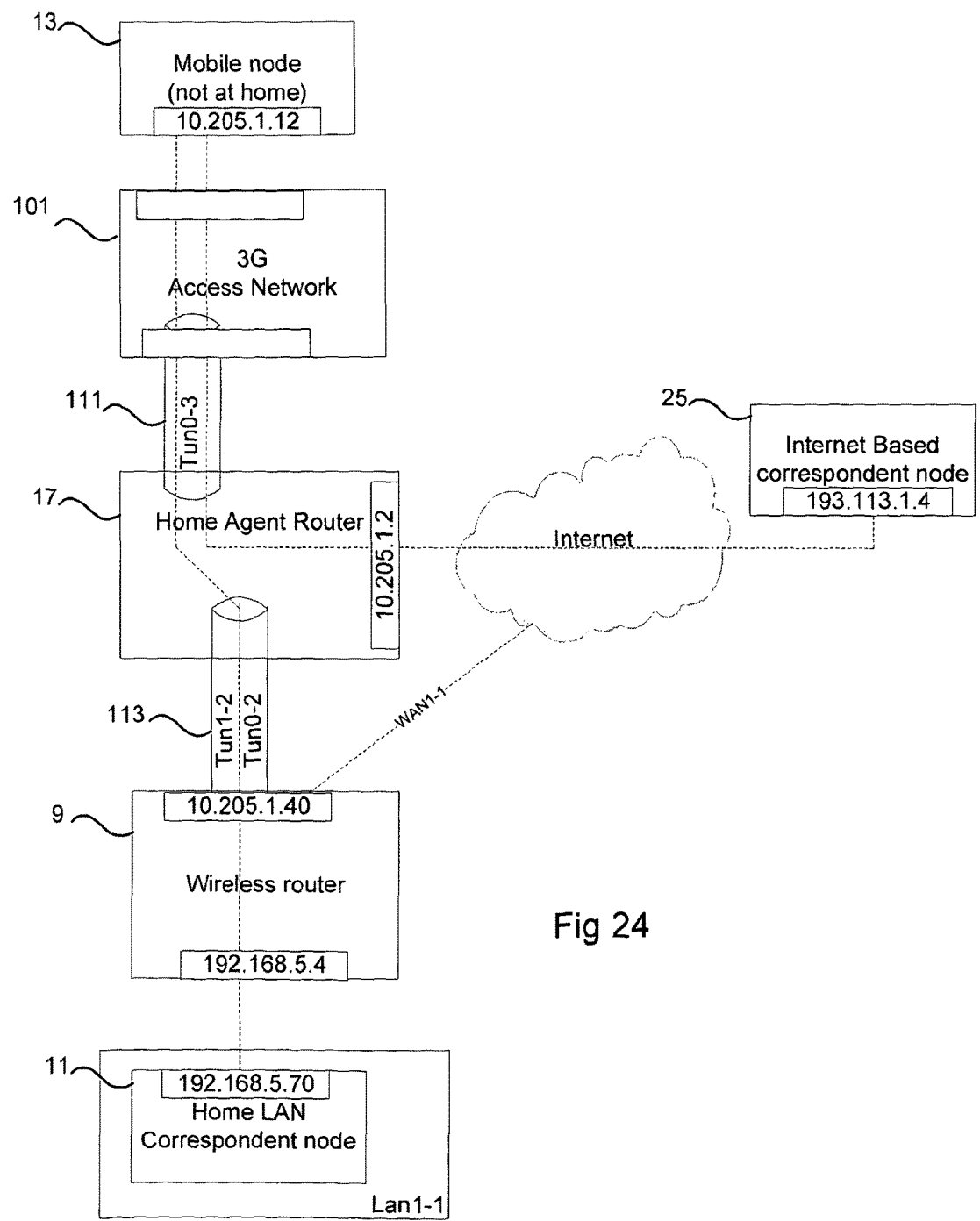
FIG. 24 schematically shows an overview of the access network after the mobile node is connected and PMIP and Home tunnels have been established.

FIG. 24 shows an overview of the network configuration and data packet tunnels when the mobile node is roaming on a different network. In particular, the standard PMIP tunnel 111 exists between the 3G access point router 103 and the home agent router 17 and the Home Tunnel 113 links the home agent router 17 to the home access point router 9. Data is routed between the mobile node 13 and the internet correspondent node 25 via the PMIP tunnel and the home agent router 17. However, data packet flow between the mobile node 13 and the home correspondent node 11 traverses the PMIP tunnel and the Home tunnel. Due to the routing configuration of the home agent router 17 and the home access point router 9, other external network entities cannot access the home correspondent node 11. For example, at the home agent router 17, only packets with source IP address of 10.205.1.12 (received on the PMIP tunnel 111 Tun0-3) are allowed to enter the home tunnel 113 Tun0-2.

Figure 25:
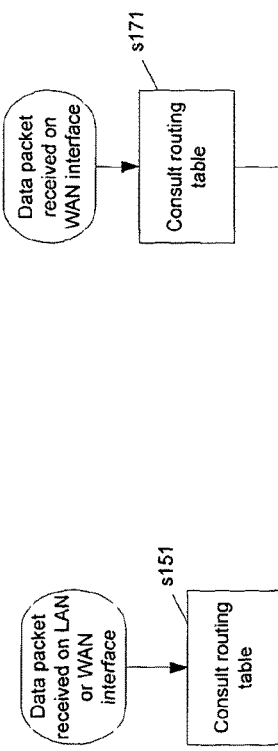
FIG. 25 is a flowchart showing the operation of the home access point router when a mobile node is connected and a home tunnel has been established.

The routing operation of the Home access point router 9 will now be described with reference to FIG. 25. Once a packet is received, in step s151 the routing table 65 is consulted. At step s153 the destination of the packet is inspected and if the packet is addressed to the mobile node 13 then the packet is sent at step s155 to the home tunnel 113 Tun1-2 and processing ends. Returning to step s123, if the packet was not addressed to the mobile node 13, then at step s157 another test is performed to determine whether the destination is on the LAN, if it is then at step s159 the packet is sent on the LAN interface 53. Otherwise at step s161 the packet is sent to the WAN interface 55.

Figure 26:
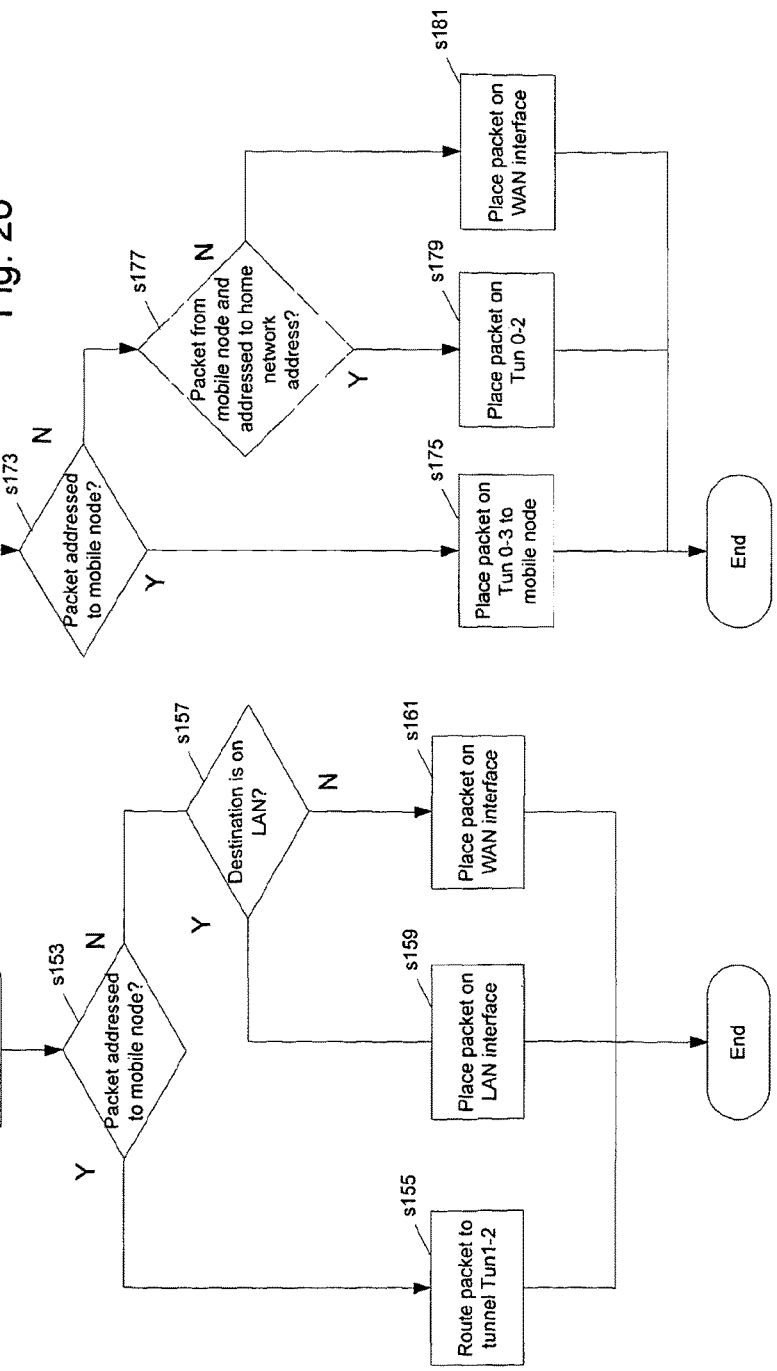
FIG. 26 is a flowchart showing the operation of the home agent router when a mobile node is connected and a home tunnel has been established.

The routing operation of the Home Agent router 17 will be described with reference to FIG. 26. When a packet is received on the WAN interface 81, at step s171 the routing table 85 is checked then at step s173 the destination of the packet is determined. If the packet is addressed to the mobile node 13 then processing proceeds to step s175 where the packet is sent on the PMIP tunnel 111 Tun0-3 to the mobile node located on the 3G network 101 and processing ends.

Returning to step s173, if the received packet is not addressed to the mobile node 13 then the other rules in the routing table 85 are checked for matches. In step s177, if the packet was received from the mobile node 13 (via the PMIP tunnel 111) and addressed to the home correspondent node 11 on the mobile node's 13 home network then in step s179 the packet is sent onwards via the Home Tunnel 113 Tun 0-2.

Alternatively at step s181, if the packet matches neither of these criteria then it is sent out on the WAN interface 81.

When the mobile node 13 leaves the 3G network, perhaps by returning home to the home WLAN access point router 9, the routing tables are returned to their original state and the data tunnels may be torn down if no other mobile nodes are making use of them.

In the above description, the mobile node 13 migrated to a 3G wireless connection and therefore a 3G PMIP access point router containing a MAG 105 was utilised. Of course, it is also possible for the mobile node 13 to migrate to another WLAN based access point router containing a corresponding MAG. The operation of that MAG and the home agent router 17 in establishing tunnels and routing table updates is the same as for the 3G PMIP access router and therefore will not be described again.

In the above description, the mobile node 13 maintains session continuity as it roams the access network 1 while at the same time maintaining access to resources on its home network. This home network access is achieved by modifying the routing tables of the home agent router 17 and the access point routers and also by establishing data tunnels.

Alternatives and Modifications

In the embodiment, during the registration phase, the association data is stored in the AAA server 19. It will be appreciated that this data could be stored in different locations. In an alternative the association data is stored in both the AAA server 19 and the home access point router 9. In which case the home access point router 9 also stores the list of approved user identities.

During authentication, when the AAA response is received containing the user identifier and indicating that the user's identity is valid, the home access point router 9 itself performs the comparison of the user identify against a locally held list of permitted users allowed to access the local LAN, and obtains the identity of the LMA 23 for that user.

In a further alternative, a dedicated LMA database stores an association between the allowed users and the home access point router 9.

In the embodiment, the home access point router was configured to establish a single home network. In an alternative, the home access point router is configured to establish multiple SSIDs which appear as two or more co-located WLAN access points on independent LANs. One of the LANs is a home network providing private access and authenticated using WEP/WPA keys and the MAG functions as in the embodiment with regards to this LAN. The other LAN is a public hotspot network providing public access to both the internet and the MAG is configured to perform known PMIP functions for mobile nodes located on this network. In accordance with the embodiment, the MAGS and LMA function to provide access to both the internet and the private network.

What is claimed is:

1. A method of accessing resources on a data network, the data network having at least one mobile node, a plurality of access routers located at an edge of the data network and at least one mobility server, the at least one mobility server being configured to allocate a network address identifier for the at least one mobile node so that the at least one mobile node can connect to different ones of the access routers while maintaining a consistent network address to other devices in the data network, and maintain data packet tunnels to different ones of the plurality of access routers at different times in dependence on a current network location of the at least one mobile node; and a data store storing at least one association between said user of the at least one node and a respective access router from the plurality of access routers configured as the private local area network access router for said user to provide selective access to a private local area network, wherein one of the plurality of access routers is a private local area network access router associated with a user of the at least one mobile node, and connected to a local network of devices configured with network addresses in a private network address range, the method comprising:
the at least one mobile node sending data packets addressed to the private network address range via a first data packet tunnel to the at least one mobility server;
the at least one mobility server:
maintaining a second data packet tunnel with the private local area network access router associated with the user of the at least one mobile node;
inspecting said data packets sent from the at least one mobile node;
determining a user associated with said data packets;
accessing said data store to determine whether the user of the at least one mobile node has an associated private local area network access router permission to access the private network address range;
if the user has permission, identifying the second data packet tunnel from the mobility server to the private local area network access router associated with the user of the at least one mobile node based on the private network address range contained in the data packets sent from the at least one mobile node; and
redirecting said data packets to the second data packet tunnel to the private local area network access router associated with the user of the at least one mobile node, and
the private local area network access router forwarding data packets received from the second data packet tunnel to the local network of devices, so as to allow data packets to be exchanged between the at least one mobile node and the local network of devices.

2. A method according to claim 1, further comprising:
generating the second data packet tunnel from the mobility server to the private local area network access router based on an association between a user identifier, the allocated network address identifier of the at least one mobile node and access router identifier.

3. A method according to claim 1 wherein the data network is configured to operate in accordance with the proxy mobile IPv6 protocol.

4. A method according to claim 3, wherein the at least one mobility server is configured to operate as a local mobility anchor for the at least one mobile node.

5. A data network comprising:
at least one mobile node;
a plurality of access routers located at an edge of the data network, one of the plurality of access routers being configured as a private local area network access router associated with a user of the at least one mobile node, and connected to a local network of devices configured with network addresses in a private network address range;

at least one mobility server configured to:
  allocate a network address identifier for the at least one mobile node so that the at least one mobile node can connect to different ones of the access routers while maintaining a consistent network address to other devices in the data network, and
  maintain data packet tunnels to different ones of the plurality of access routers at different times in dependence on a current network location of the at least one mobile node; and
a data store storing at least one association between said user of the at least one node and a respective access router from the plurality of access routers configured as the private local area network access router for said user to provide selective access to a private local area network, wherein the at least one mobile node is operable to send data packets addressed to the private network address range via a first data packet tunnel to the at least one mobility server;

the mobility server is operable to:
  maintain a second data packet tunnel with the private local area network access router associated with the user of the at least one mobile node;
  inspect said data packets sent from the at least one mobile node; and
  determine a user associated with said data packets;
  access said data store to determine whether the user of the at least one mobile node has an associated private local area network access router permission to access the private network address range;
  if the user has permission, identify the second data packet tunnel from the mobility server to the private local area network access router associated with the user of the at least one mobile node, based on the private network address range contained in the data packets sent from the at least one mobile node; and
  redirect said data packets to the second packet tunnel to the private local area network access router associated with the user of the at least one mobile node, and the private local area network access router is operable to forward data packets received from the second data packet tunnel to the local network of devices, so as to allow data packets to be exchanged between the at least one mobile node and the local network of devices.

6. A data network according to claim 5 further comprising an authentication server in the core of the network for authenticating the credentials of the mobile node.

7. A data network according to claim 5 wherein the network is configured to operate in accordance with the proxy mobile IPv6 protocol.

8. A data network according to claim 7, wherein the at least one mobility server is configured to operate as a local mobility anchor for the at least one mobile node.

9. A system for data access in a data network supporting mobile device mobility, comprising:
  at least one mobile device, each mobile device being associated with a user;
  a mobility server for allocating a network address identifier to the at least one mobile device and for maintaining data packet tunnels to different ones of a plurality of routers at different times in dependence on a current network location of the at least one mobile device;
  a first router, which is one of said plurality of routers, connected to said at least one mobile device and said mobility server via a first data packet tunnel, and configured to forward data packets sent from a correspondent node and received from the mobility server, to the at least one mobile device;
  a second router, which is another one of said plurality of routers, connected to said mobility server via a second data packet tunnel and further connected to a private local area network of private local area network devices associated with the user of the at least one mobile device;
  a data store for storing at least one association between said user of the at least one mobile device and the private local area network to provide selective access to a private local area network;

wherein:

when the at least one mobile device sends data packets addressed to the private local area network of private local area network devices associated with the user, the first router is configured to send the data packets to the mobility server via the first data packet tunnel;

the mobility server is configured to:
  maintain the second data packet tunnel with the second router;
  access the data store to determine whether the at least one mobile device and the private local area network are associated with the same user so as to determine whether or not the user has permission to access the private local area network;
  if the at least mobile device and the private local area network are not associated with the same user, the mobility server rejects the data packets; and
  if the at least one mobile device and private local area network are associated with the same user so that the user has permission to access the private local area network, the mobility server forwards the data packets via the second data packet tunnel to the second router; and the second router is configured to:
  route data packets received from the second data packet tunnel to the private local area network of private local area network devices associated with the user.

10. A mobility server for use in a data network which further comprises at least one mobile node and a plurality of access routers, one of the plurality of access routers being configured as a private local area network access router associated with a user of the at least one mobile node, and connected to a local network of devices configured with network addresses in a private network address range, wherein the mobility server is configured at least to:
  allocate a network address identifier for the at least one mobile node so that the at least one mobile node can connect to different ones of the access routers while maintaining a consistent network address to other devices in the data network;
  maintain data packet tunnels to different ones of the plurality of access routers at different times in dependence on a current network location of the at least one mobile node; and
  provide access to a data store storing at least one association between said user of the at least one node and a respective access router from the plurality of access routers configured as the private local area network access router for said user to provide selective access to a private local area network, maintain a second data packet tunnel with the private local area network access router associated with the user of the at least one mobile node;

receive data packets addressed to the private network address range and sent from the at least one mobile node via a first data packet tunnel;

inspect said received data packets sent from the at least one mobile node;

determine a user associated with said data packets;

access said data store to determine whether the user of the at least one mobile device has an associated private local area network access router permission to access the private network address range;

if the user has permission, identify a second data packet tunnel from the mobility server to the private local area network access router associated with the user of the at least one mobile node, based on the private network address range contained in the data packets sent from the at least one mobile node; and redirect said data packets to the second packet tunnel to the private local area network access router associated with the user of the at least one mobile node, thereby enabling the private local area network access router to forward data packets received from the second data packet tunnel to the local network of devices, and thereby allowing data packets to be exchanged between the at least one mobile node and the local network of devices.

* * * * *